United States Patent Office 3,294,814
Patented Dec. 27, 1966

3,294,814
4-NITROPYRAZOLES
Franz Reicheneder, Ludwigshafen (Rhine), Germany, and Karl Dury, deceased, late of Kirchheimbolanden, Germany, by Johanna Maria Dury, heiress-at-law, Kirchheimbolanden, Germany, assignors to Badische Anilin- & Soda-Fabrik Aktiengesellschaft, Ludwigshafen (Rhine), Germany
No Drawing. Filed Mar. 4, 1965, Ser. No. 439,518
Claims priority, application Germany, Mar. 6, 1964,
B 75,758
3 Claims. (Cl. 260—310)

This invention relates to a process for the production of 4 - nitropyrazoles from 4-nitro-5-hydroxypyridazones-(6).

It is already known that 4-nitropyrazole may be prepared by nitration of pyrazole with nitrating acid. It is also known that 1-phenyl-4-nitropyrazole is obtained by reacting phenyl hydrazine with nitromalonoaldehyde. A disadvantage of these methods is that the desired pyrazoles are obtained only in moderate yields and owing to the formation of byproducts of 4-nitropyrazoles can be separated from the reaction mixture only by an expensive method. Furthermore the nitration of pyrazoles bearing aryl groups as substituents is not possible without simultaneous nitration of the aryl radical.

It is an object of this invention to provide a new method for the production of 4-nitropyrazoles starting from compounds which have not hitherto been used for this purpose. It is another object of this invention to provide a method by which 4-nitropyrazole derivatives are obtained which were previously not known. A further object of the invention is the new 4-nitropyrazole derivatives themselves.

These are objects achieved by heating 4-nitro-5-hydroxypyridazones-(6) having the general formula:

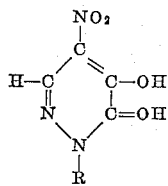

I in the presence of an inert solvent or suspension agent at a temperature of from 50° to 180° C. In the formula, R denotes a hydrogen atom or an alkyl, cycloalkyl, aryl or arylsulfonyl radical. The 4-nitropyrazoles which may be prepared according to the process have the following formula:

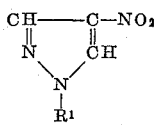

II in which the radical $R^1$ has the above meaning.

The 4-nitro-5-hydoxypyridazones-(6) having the general Formula I which are used as initial materials are new substances. They may be obtained for example by reaction of 4,5-dihalopyridazones-(6) with a nitrite, for example in the molar ratio 1:3, in the presence of water at temperatures between about 50° and 180° C.

In the preferred initial materials, the radical $R^1$ denotes a hydrogen atom, an alkyl radical having one to four carbon atoms, a cycloalkyl radical having five to eight carbon atoms, the phenyl radical or the benzenesulfonyl radical.

Examples of suitable inert solvents or suspension agents are water, dilute acids, alkanols with 1 to 4 carbon atoms, for example methanol or ethanol, or, α,ω-alkanediols with two to six carbon atoms, for example glycol or propanediol. Five to six membered cyclic ethers, such as dioxane or tetrahydrofuran, and dimethyl sulfoxide, tetramethylene sulfone, tetramethylurea, N-methylpyrrolidone or mixtures of the said solvents may also be used. The solvents or suspension agents are generally used in an amount which is twice to twenty times the weight of the initial pyridazone.

The process may be carried out in neutral, acid or alkaline reacting media. When an alkaline reacting medium is used, the pH value of the reaction mixture should not exceed 10. The pH value may be adjusted for example with ammonia, the hydroxides, oxides or carbonates of the alkali metals or alkaline earth metals, such as sodium, potassium, lithium, calcium or barium. Amines, such as methylamine, dimethylamine or dimethylaniline, may also be used. The amount to be used depends on the pH value at which the reaction is to be carried out. If the reaction is to be carried out in acid medium, it is possible to use a mineral acid medium, for example hydrochloric acid or sulfuric acid. Carboxylic acids, such as formic acid, acetic acid or oxalic acid may also be used. When using a neutral or alkaline solution or suspension, metals, for example nickel, copper or iron, may be added to the reaction mixture as catalysts.

The process may be carried out for example by placing the initial material in the solvent, adding the acid or base in cases where an acid or basic medium is to be used, and then heating the reaction mixture to the reaction temperature, if desired under the pressure thereby set up. It is also possible to use higher pressures, for example 5 to 100 atmospheres, by forcing in an inert gas, for example nitrogen.

The reaction mixture is cooled and if necessary released from pressure, and the desired 4-nitropyrazole is usually precipitated in very pure form and may be readily recovered, for example by filtration.

The previously unknown 4-nitropyrazoles have the following structural formula:

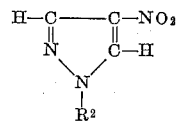

in which $R^2$ denotes an alkyl group having preferably one to four carbon atoms, an arylsulfonyl radical, preferably the benzenesulfonyl radical, or a cycloalkyl radical having preferably six to eight carbon atoms.

The compounds which may be prepared by the new process are valuable intermediates for the production of dyes, pharmaceuticals and pest control agents. By reducing the nitro group to an amino group, the corresponding aminopyrazoles are obtained which in turn may be diazotized and then coupled for example with dimethylaniline. The compounds thus prepared are valuable azo dyes.

The invention is further illustrated by the following examples. The parts specified in the examples are parts by weight.

*Example 1*

10 parts of 1-phenyl-4-nitro-5-hydroxypyridazone-(6) is dissolved in 50 parts of dimethyl sulfoxide and kept at 150° C. for one hour. The reaction mixture is poured into water. 6.5 parts of 1-phenyl-4-nitropyrazole crystallizes out, and is isolated from the reaction mixture by filtration. The melting point of a sample recrystallized from acetonitrile is 128° to 129° C. The yield is 79.5% of the theory with reference to the 1-phenyl-4-nitro-5-hydroxypyridazone-(6).

If tetramethylene sulfone or tetramethylurea be used as solvent instead of dimethyl sulfoxide, the same result is obtained.

Analysis—$C_9H_7O_2N_3$ (189.17): Calculated: C, 57.14%; H, 3.73%; O, 16.92%; N, 22.21%. Found: C, 56.8%; H, 3.9%; O, 17.2%; N, 22.1%.

Example 2

10 parts of 1-tosyl-4-nitro-5-hydroxypyridazone-(6) is dissolved in 100 parts of water to which 5 parts of an aqueous 2 N caustic soda solution has been added and the solution is allowed to boil for ten minutes. A crystalline product separates from the deep yellow solution with increasing cloudiness, even while it is still hot. The whole is cooled and the 1-tosyl-4-nitropyrazole formed is filtered off and recrystallized twice from methanol. 7 parts of 1-tosyl-4-nitropyrazole is obtained in the form of white needles having a melting point of 116° to 117° C.

Analysis—$C_{10}H_9O_4N_3S$ (267): Calculated: C, 44.8%; H, 3.37%; O, 23.9%; N, 15.7%; S, 11.98%. Found: C, 44.8%; H, 3.6%; O, 22.4%; N, 15.5%; S, 12.4%.

Example 3

50 parts of 1-phenyl-4-nitro-5-hydroxypyridazone-(6) is suspended in 500 parts of aqueous concentrated ammonia. 10 parts of Raney-nickel is added to the suspension and the whole is kept at 100° C. for 2½ hours. At the same time the pressure in the reactor is brought to 50 atmospheres by forcing in hydrogen. After the whole has been cooled it is diluted with water, the precipitate formed is suction filtered and then boiled up exhaustively with acetonitrile. The acetonitrile solution is filtered and concentrated. 35 parts of 1-phenyl-4-nitropyrazole is obtained having a melting point of 128° to 129° C. The yield is 85.6% of the theory with reference to 1-phenyl-4-nitro-5-hydroxypyridazone-(6) used.

Example 4

50 parts of 1-phenyl-4-nitro-5-hydroxpyridazone-(6) is suspended in 250 parts of aqueous concentrated ammonia which is diluted with another 250 parts of water. 15 parts of Raney-nickel is added and the mixture is kept in an autoclave at 80° C. under a pressure of 5 atmospheres of nitrogen for six hours. The product is worked up as in Example 3. 25 parts of 1-phenyl-4-nitropyrazole is obtained which is identical with that obtained in Example 3.

Example 5

50 parts of 1-phenyl-4-nitro-5-hydroxypyridazone-(6) is kept for ten hours at a temperature of 80° C. and a pressure of 10 atmospheres of hydrogen in 500 parts of aqueous concentrated ammonia with an addition of 10 parts of copper powder. Processing is carried out in the way described in Example 3. 36 parts of 1-phenyl-4-nitropyrazole is obtained.

32 parts of 1-phenyl-4-nitropyrazole is obtained by using carbonyl iron powder instead of copper powder.

Example 6

5 parts of 1-phenyl-4-nitro-5-hydroxypyridazone-(6) is heated with 30 parts of 2 N hydrochloric acid in a glass sealing tube for six hours at 120° C. The tube is cooled and opened carefully (it is under pressure) and the contents are rinsed out and filtered. 3.5 parts of 1-phenyl-4-nitropyrazole is obtained.

The same result is achieved by using concentrated hydrochloric acid and a mixture of hydrochloric acid and water in the ratio 1:1 instead of 2 N hydrochloric acid.

Example 7

5 parts of 1-phenyl-4-nitro-5-hydroxypyridazone-(6) is suspended in 35 parts of water and heated for six hours at 150° C. in the way described in Example 6. Processing is carried out as described in Example 6. 4 parts of 1-phenyl-4-nitro-pyrazole is obtained.

Example 8

5 parts of 1-methyl-4-nitro-5-hydroxypyridazone-(6) is heated in 30 parts of 15% hydrochloric acid for five hours at 120° C. analogously to Example 6. The product is processed as in Example 6. 3 parts of 1-methyl-4-nitro-pyrazole having a melting point of 91° to 92° C. is obtained.

Analysis.—$C_4H_5O_2N_3$ (127.10): Calculated: C, 37.80%; H, 3.97%; O, 25.18%; N, 33.06%. Found: C, 38.1%; H, 4.0%; O, 25.0%; N, 32.5%.

Example 9

5 parts of 4-nitro-5-hydroxypyridazone-(6) is heated in 30 parts of 10% hydrochloric acid for six hours at 150° C. analogously to Example 6. The product is processed as in Example 6. 3 parts of 4-nitropyrazole having a melting point of 161° to 162° C. is obtained.

Analysis—$C_3H_3O_2N_3$ (113.08): Calculated: C, 31.86%; H, 2.67%; O, 28.30%; N, 37.16%. Found: C, 32.2%; H, 2.8%; O, 27.9%; N, 36.9%.

Example 10

8 parts of 1-cyclohexyl-4-nitro-5-hydroxypyridazone-(6) in 60 parts of hydrochloric acid (prepared from concentrated hydrochloric acid and water in the ratio 1:1) is heated in a sealing tube for six hours at 120° C. The tube is cooled and opened, and the reaction mixture filtered. The filter residue is dissolved in benzene and the solution chromatographed on aluminum oxide. From the eluate, by evaporating the benzene, 5 parts of 1-cyclohexyl-4-nitropyrazole is obtained having a melting point of 60° to 67° C.

Analysis—$C_{10}H_{13}O_2N_3$ (195.22): Calculated: C, 55.37%; H, 6.71%; O, 16.39%; N, 21.53%. Found: C, 55.6%; H, 6.8%; O, 16.3%; N, 21.6%.

We claim:
1. A 4-nitropyrazole having the formula:

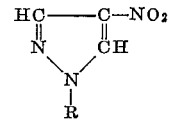

in which R is a member selected from the group consisting of benzene sulfonyl, tosyl, and cycloalkyl of 5 to 8 carbon atoms.
2. 1-tosyl-4-nitropyrazole.
3. 1-cyclohexyl-4-nitropyrazole.

References Cited by the Examiner

UNITED STATES PATENTS 3,102,890   9/1963   Wright _____ 260—310

OTHER REFERENCES

Elderfield: Heterocyclic Compounds, vol. 5, page 105, New York, Wiley, 1957.

Maki et al.: Jour. Pharm. Soc. (Japan), vol. 83, pages 725–728 (1963).

JOHN D. RANDOLPH, *Primary Examiner.*

WALTER A. MODANCE, *Examiner.*

NATALIE TROUSOF, *Assistant Examiner.*